(12) United States Patent
Deguchi et al.

(10) Patent No.: US 6,236,631 B1
(45) Date of Patent: May 22, 2001

(54) FRAME NUMBER DETECTION FOR SIGNALS PRODUCED FROM OPTICAL DISK

(75) Inventors: Hironori Deguchi, Kadoma; Makoto Usui, Osaki, both of (JP)

(73) Assignee: Matsushita Electric Industrial Co., Ltd., Osaka-fu (JP)

(*) Notice: Subject to any disclaimer, the term of this patent is extended or adjusted under 35 U.S.C. 154(b) by 0 days.

(21) Appl. No.: 09/205,288

(22) Filed: Dec. 4, 1998

(30) Foreign Application Priority Data

Dec. 8, 1997 (JP) .................................................. 9-336839

(51) Int. Cl.[7] ...................................................... G11B 3/90
(52) U.S. Cl. ..................... 369/53.34; 369/33; 369/124.08
(58) Field of Search ................................. 369/32, 47, 48, 369/53, 54, 58, 124.08, 33, 59

(56) References Cited

U.S. PATENT DOCUMENTS 4,620,300 * 10/1986 Ogawa .................................... 369/33
5,572,496 * 11/1996 Hayashi et al. ......................... 396/59

FOREIGN PATENT DOCUMENTS 8-289249   11/1996  (JP) .
10-27428    1/1998  (JP) .

* cited by examiner

Primary Examiner—Paul W. Huber
(74) Attorney, Agent, or Firm—Wenderoth, Lind & Ponack, L.L.P.

(57) ABSTRACT

A frame number detector for detecting frame number receives input signals consisting of a plurality of sectors. A sector consists of a plurality of frames, a frame including synchronizing signals and data, the synchronizing signals having a pattern used to identify a frame number in a sector, the pattern being defined to identify a frame number from a pattern of the synchronizing signals in a frame or from patterns of the synchronizing signals in consecutive frames. A pattern of synchronizing signals is extracted for consecutive frames from input signals, and the extracted pattern is compared with a predetermined pattern to determine with majority principle whether the extracted pattern agrees with the predetermined pattern. Then, a frame number is determined based on an output signal of the comparison. In an example, a block consists of for example two frames of the extracted pattern of synchronizing signals, and the comparison is performed in the unit of block. Thus, the frame number is detected correctly even when synchronization patterns of data comprises synchronization patterns having short distances between codes.

12 Claims, 10 Drawing Sheets

| Sync number | Sync code | |
|---|---|---|
| | ID code | 14T4T |
| SY0 | 0001 0010 0100 0<br>0001 0010 0000 0<br>1001 0010 0000 0<br>1001 0010 0100 0 | 100 0000 0000 0001 0001<br>100 0000 0000 0001 0001<br>100 0000 0000 0001 0001<br>100 0000 0000 0001 0001 |
| SY1 | 0000 0100 0000 0<br>0000 0100 0100 0<br>1000 0100 0100 0<br>1000 0100 0000 0 | 100 0000 0000 0001 0001<br>100 0000 0000 0001 0001<br>100 0000 0000 0001 0001<br>100 0000 0000 0001 0001 |
| SY2 | 0001 0000 0000 0<br>0001 0000 0100 0<br>1001 0000 0100 0<br>1001 0000 0000 0 | 100 0000 0000 0001 0001<br>100 0000 0000 0001 0001<br>100 0000 0000 0001 0001<br>100 0000 0000 0001 0001 |
| SY3 | 0000 1000 0000 0<br>0000 1000 0100 0<br>1000 0010 0100 0<br>1000 0010 0000 0 | 100 0000 0000 0001 0001<br>100 0000 0000 0001 0001<br>100 0000 0000 0001 0001<br>100 0000 0000 0001 0001 |
| SY4 | 0010 0000 0000 0<br>0010 0000 0100 0<br>1000 1000 0100 0<br>1000 1000 0000 0 | 100 0000 0000 0001 0001<br>100 0000 0000 0001 0001<br>100 0000 0000 0001 0001<br>100 0000 0000 0001 0001 |
| SY5 | 0010 0010 0100 0<br>0010 0010 0000 0<br>1000 1001 0000 0<br>1000 0001 0000 0 | 100 0000 0000 0001 0001<br>100 0000 0000 0001 0001<br>100 0000 0000 0001 0001<br>100 0000 0000 0001 0001 |
| SY6 | 0010 0100 1000 0<br>0010 0000 1000 0<br>1001 0000 1000 0<br>1000 0000 0100 0 | 100 0000 0000 0001 0001<br>100 0000 0000 0001 0001<br>100 0000 0000 0001 0001<br>100 0000 0000 0001 0001 |
| SY7 | 0010 0100 0100 0<br>0010 0100 0000 0<br>1000 1000 1000 0<br>1000 0000 1000 0 | 100 0000 0000 0001 0001<br>100 0000 0000 0001 0001<br>100 0000 0000 0001 0001<br>100 0000 0000 0001 0001 |

Fig.4

| | SY0 | SY1 | SY2 | SY3 | SY4 | SY5 | SY6 |
|---|---|---|---|---|---|---|---|
| SY1 | | | | | | | |
| SY2 | | | | | | | |
| SY3 | | | ○ | ○ | | | |
| SY4 | | | ○ | ○ | ○ | | |
| SY5 | ○ | | | ○ | | | |
| SY6 | | | ○ | | ○ | | |
| SY7 | | | | | ○ | ○ | ○ |

Fig.5A

| SY6 | | SY2 | | SY6 | | SY3 | | SY6 | | SY4 |
|---|---|---|---|---|---|---|---|---|---|---|

True

Frame number: 12  13  14  15  16

Fig.5B

| SY6 | | SY3 | | SY6 | | SY3 | | SY6 | | SY4 |
|---|---|---|---|---|---|---|---|---|---|---|

Error

Frame number: 12  ?  16  ?  16

Errors of frame number

FRAME NUMBER DETECTION FOR SIGNALS PRODUCED FROM OPTICAL DISK

BACKGROUND OF THE INVENTION

1. Field of the Invention

The present invention relates to an apparatus which reproduces signals from an optical disk such as a DVD-ROM, and in particular to an apparatus which detects a frame number in the reproduced signals.

2. Description of Prior Art

Recently, an optical disk has been developed to record and reproduce information optically with a laser light, and various formats are proposed to record information in an optical disk. Synchronizing signals are necessary in any format. When an optical disk is reproduced, the synchronizing signals are reproduced and counted, and a frame is decided according to the count value. That is, a frame is detected by counting the synchronizing signals. However, when a disk is rotated anomalously, the time length for a frame becomes longer or shorter. Then, synchronizing signals is counted erroneously, and it becomes uncertain which frame in a sector is reproduced. Thus, the reproduced signals are all erroneous.

Japanese Patent laid open Publication 8-289249/1996 describes an apparatus and a method for solving this problem. A recording medium or DVD-ROM has digital data in the DVD-ROM format wherein a sector consists of lines, each line consisting of frames of odd numbers and those of even numbers. A frame consists of synchronizing signals (of sync numbers) and data. In the DVD-ROM format, a synchronizing signal has one of predetermined patterns, and when a DVD-ROM is reproduced, a frame number is detected according to a combination of at least two, or preferably consecutive three or four synchronizing signals for the sake of stability of the frame number detection.

However, in the DVD-ROM format, because only a 13-bit pattern is varied in the synchronizing signals, a distance between two synchronizing signals becomes very short. If the bit length of the pattern of synchronizing signal is short, possibility of erroneous detection of frame numbers increases. On the other hand, if the bit length of the pattern in the synchronizing signal is increased, data efficiency becomes worse. If the number of synchronizing signals necessary for the determination of frame number is increased, the probability of erroneous detection is decreased. However, no errors cannot be allowed, and a ratio for the correct detection of frame number is liable to be decreased. Therefore, it is desirable to detect a frame number correctly in the data including synchronization patterns of short code distances between them.

SUMMARY OF THE INVENTION

An object of the present invention is to provide an apparatus and a method for detecting a frame number in the signals consisting of synchronization pattern of short code distances between synchronization patterns, without erroneous detection of frame number.

An apparatus according to the invention detects frame number from input signals. The input signals consist of a plurality of sectors, a sector consisting of a plurality of frames, a frame including synchronizing signals and data, the synchronizing signals having a pattern used to identify a frame number in a sector, the pattern being defined to identify a frame number from a pattern of the synchronizing signals in a frame or from patterns of the synchronizing signals in consecutive frames. In the apparatus, a pattern of synchronizing signals is extracted for consecutive X frames from input signals where X is a natural number. Then, the extracted pattern of the extracted synchronizing signals is compared with a predetermined pattern to determine whether the extracted pattern agrees with the predetermined pattern by at least Y frames or not, wherein Y is a natural number smaller than the predetermined number of consecutive frames. Then, a frame number is determined based on an output signal of the comparison.

In an example, a block consists of Z frames of the extracted pattern of synchronizing signals (for example, Z=2). The extracted pattern of synchronizing signals is compared with a predetermined pattern to determine whether the extracted pattern agrees with the predetermined pattern by at least Y blocks or not, wherein and Y and Z are natural number.

Preferably, the predetermined pattern is defined to detect the last frame in a sector, and a counter is provided to reset the frame number to be output when the last frame is detected and to increment it otherwise.

An apparatus for reproducing signals from an optical disk according to the invention comprises an optical pickup which detects a light reflected from an optical disk, a reproducing device which reproduces digital data from the reflected light, and a decoder which decodes the digital data. The decoder comprises the above-mentioned apparatus for detecting a frame number.

An advantage of the present invention is that even when the bit length of the pattern of synchronizing signals is short and the distance between codes from the synchronizing signal representing another frame is short, the frame number can be output stably without erroneous detection.

BRIEF DESCRIPTION OF THE DRAWINGS

These and other objects and features of the present invention will become clear from the following description taken in conjunction with the preferred embodiments thereof with reference to the accompanying drawings, and in which.

DETAILED DESCRIPTION OF THE PREFERRED EMBODIMENTS

Figure 1:
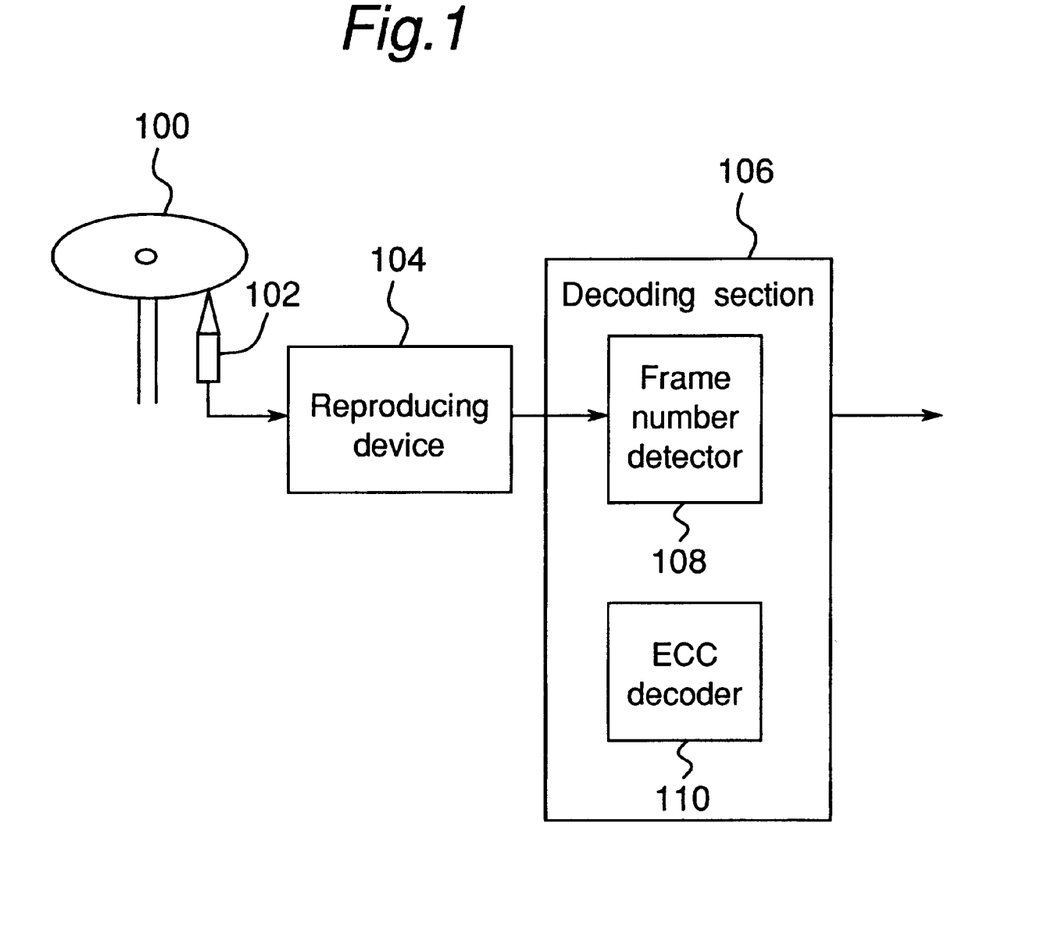
FIG. 1 is a block diagram of an apparatus for reproducing signals from an optical disk.

Referring now to the drawings, wherein like reference characters designate like or corresponding parts throughout the several views, FIG. 1 shows an apparatus for reproducing signals from an optical disk 100 such as a DVD-ROM according to a first embodiment of the invention. An optical head 102 emits a laser beam to the optical disk 100 and receives the light reflected from the disk 100 to convert the reflected light to an RF signal. A reproducing device 104 digitizes the RF signal with a predetermined threshold level and supplies the digital signal to a decoding section 106 which reproduces signals recorded in the optical disk 100. The decoding section 106 includes a frame number detector 108 to detect a frame number from the input signal and an ECC (error-checking and correction) decoder 110. The frame number detector 108 detects frame numbers in the data as explained below, and the ECC decoder 100 corrects errors in the reproduced data. This reproduction process is known for reproducing signals from an optical disk except the frame number detector 108, and it is not explained here in detail.

Before explaining the frame number detector in detail, the input signal is explained. In the input signal, a sector consists of a plurality of frames, one frame including synchronizing signals and data. The synchronizing signals have a pattern used to identify a frame number in a sector from a pattern of the synchronizing signals in a frame or in consecutive frames.

Figure 2:
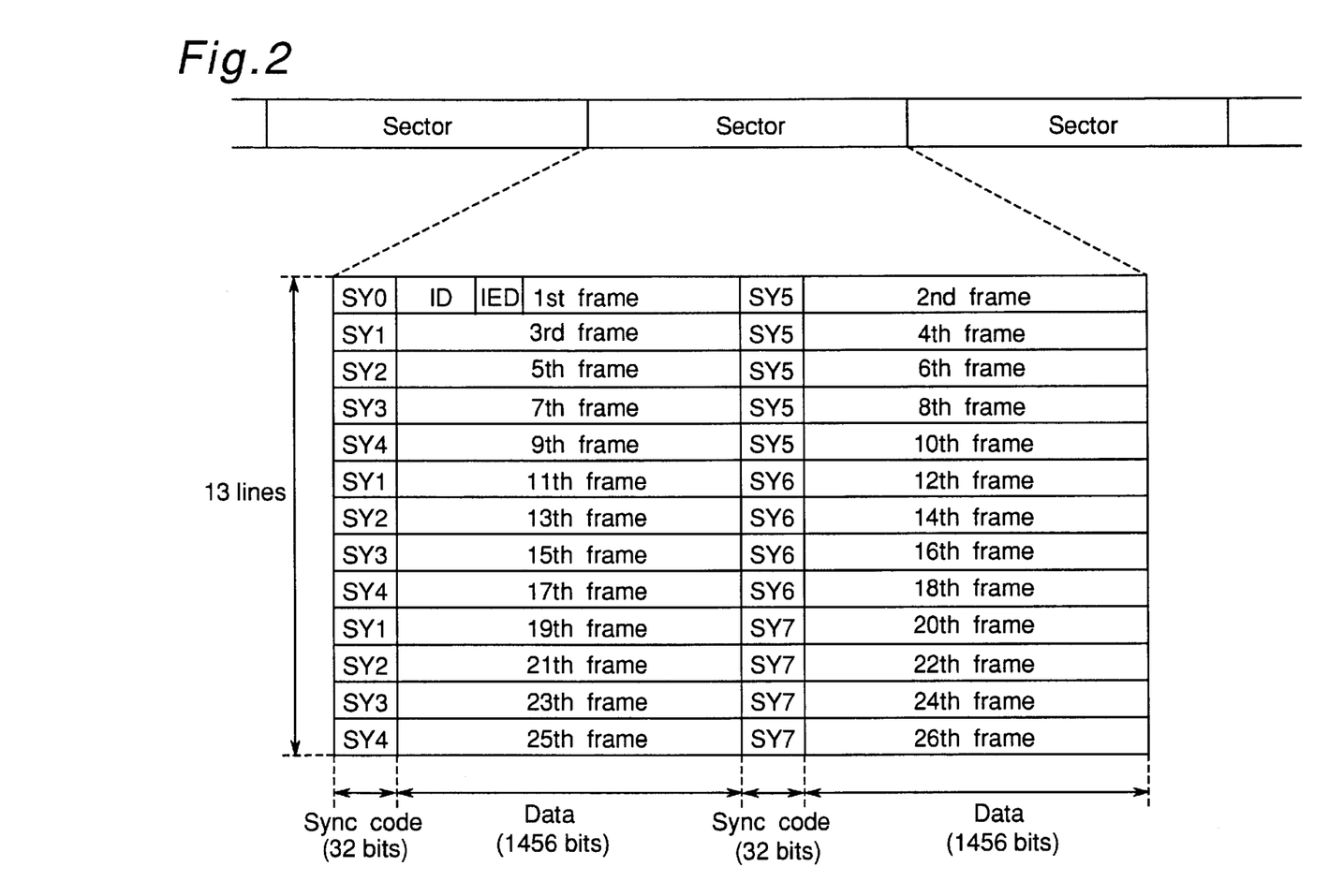
FIG. 2 is a diagram of a format of an input signal.

In this embodiment, input signals are based on the DVD-ROM format shown in FIG. 2. In input signals, a sector consists of 26 frames, and a frame consists of 23-bit synchronizing signals and 1456-bit data. Each frame has a pattern of synchronizing signals, so that a frame number in the sector can be identified from a pattern of synchronizing signals in consecutive at least two frames. The data in the top frame in a sector includes a 64-bit ID signal and a 32-bit ID error detection signal (IED). The data have been modulated with 8–16 modulation or the like.

Figure 3:
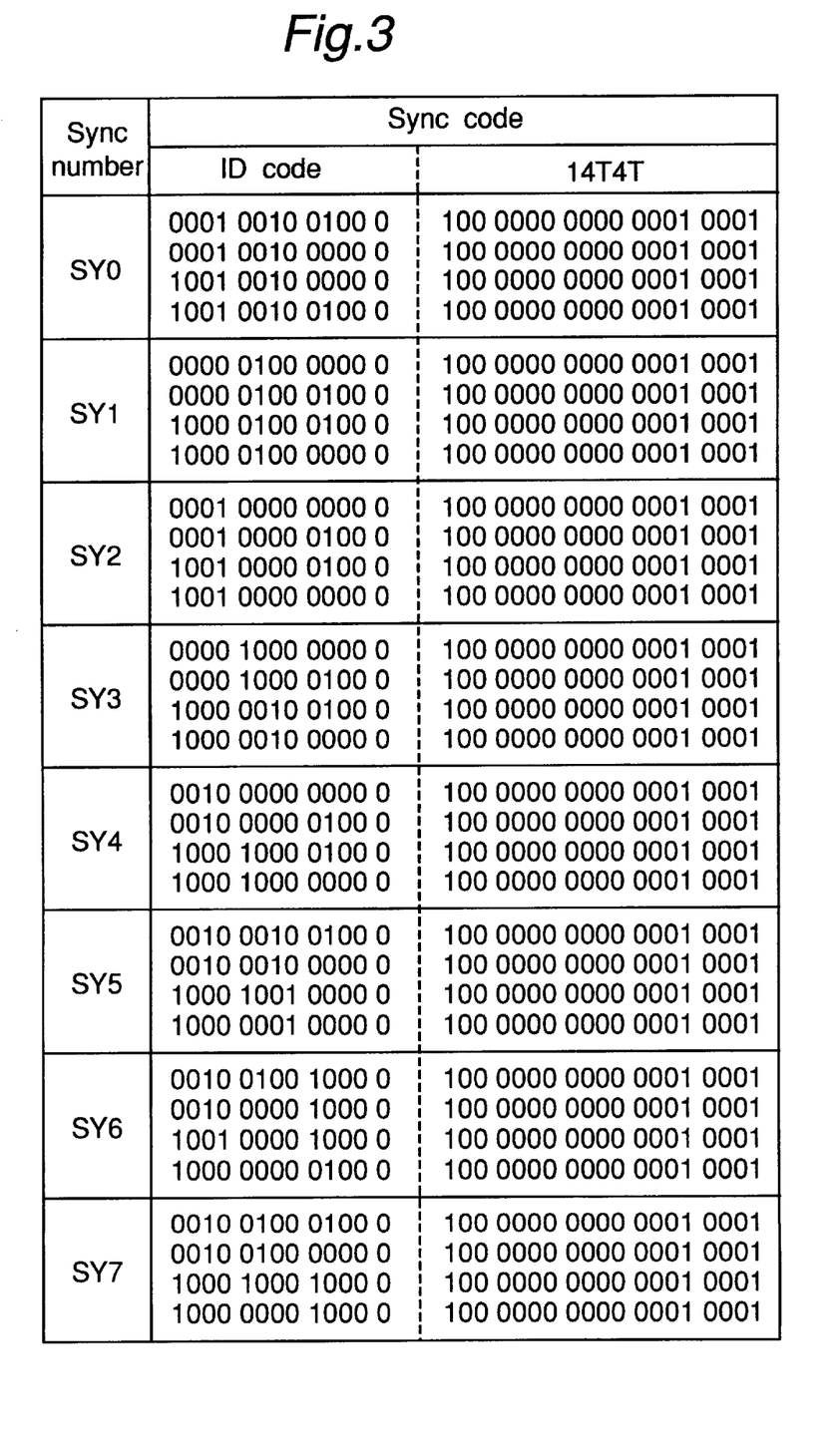
FIG. 3 is a diagram of patterns of sync codes for various sync numbers.

The synchronizing signals are represented with sync numbers SY0 to SY7, and they have patterns shown in FIG. 3. Each of sync numbers of SY0 to SY7 has four patterns of synchronizing signal or sync codes, and they are selected according to a predetermined logic and modulation process. A sync code includes a 13-bit pattern for differentiating it from the other sync numbers besides a common 19-bit pattern of "1000000000000010001". The 13-bit pattern for differentiating sync codes is hereinafter referred to as an identification (ID) code, and the 19-bit code is referred to as a 14T4T code. The identification code is defined to enable identification of a frame by detecting sync codes of at least two consecutive frames. For example, in order to discriminate the fifth frame, as shown in FIG. 2, two conditions are needed that the identification code in the prior sync code is a pattern for SY5 and that the identification code in the current sync code is a pattern for SY2. Only the first frame can be recognized from one sync code in order to read an ID code stably.

Figure 4:
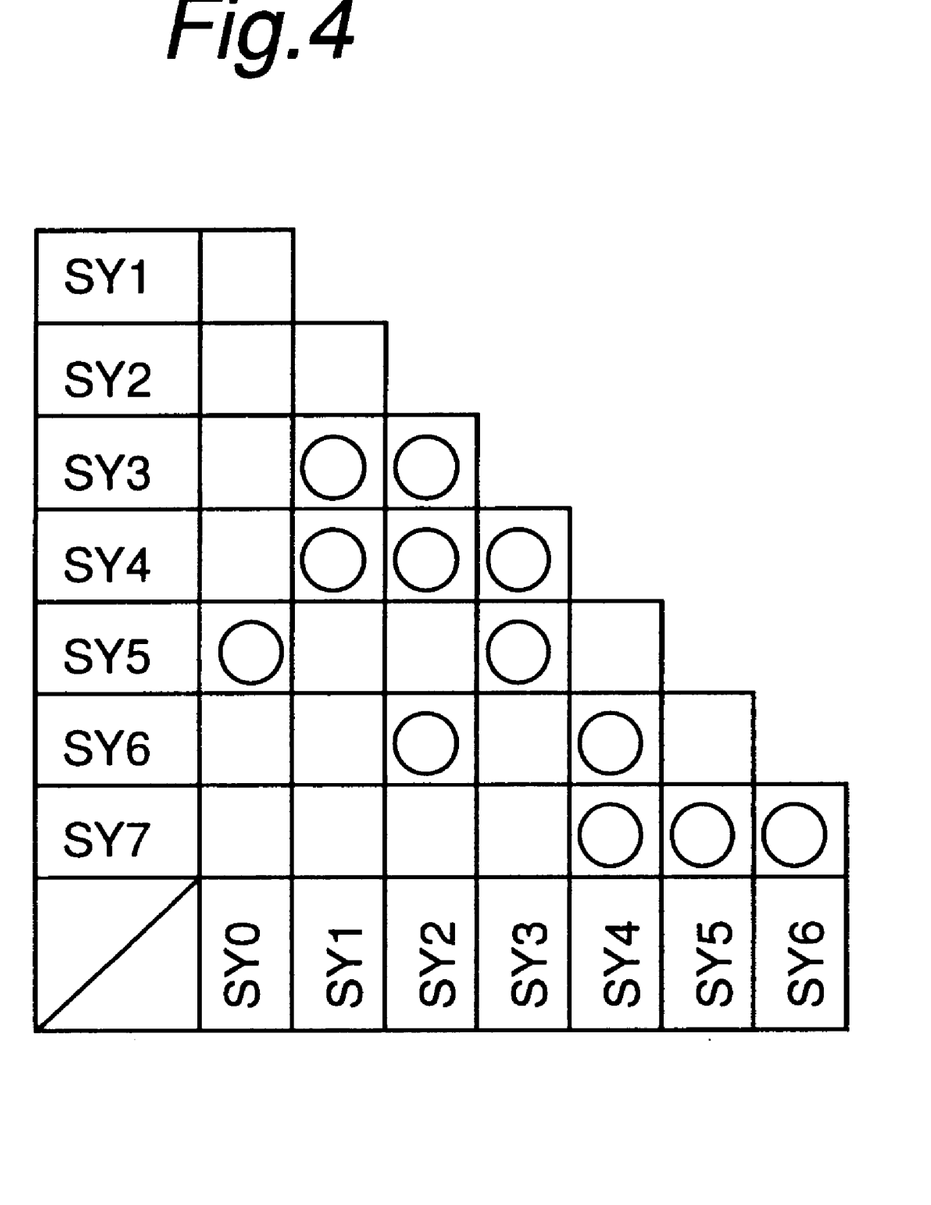
FIG. 4 is a diagram of an erroneous frame number detection due to a bit shift by one bit of synchronizing signals of input signals.
Figure 5A:
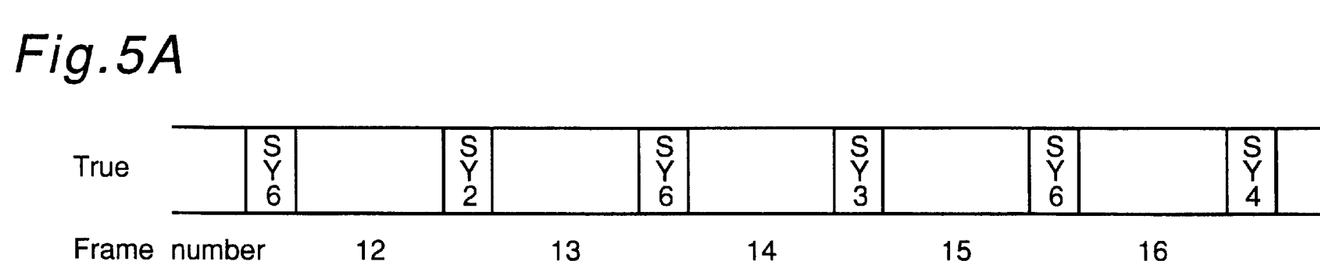
FIGS. 5A and 5B are diagrams of correct detection and erroneous detection of a frame number.
Figure 5B:
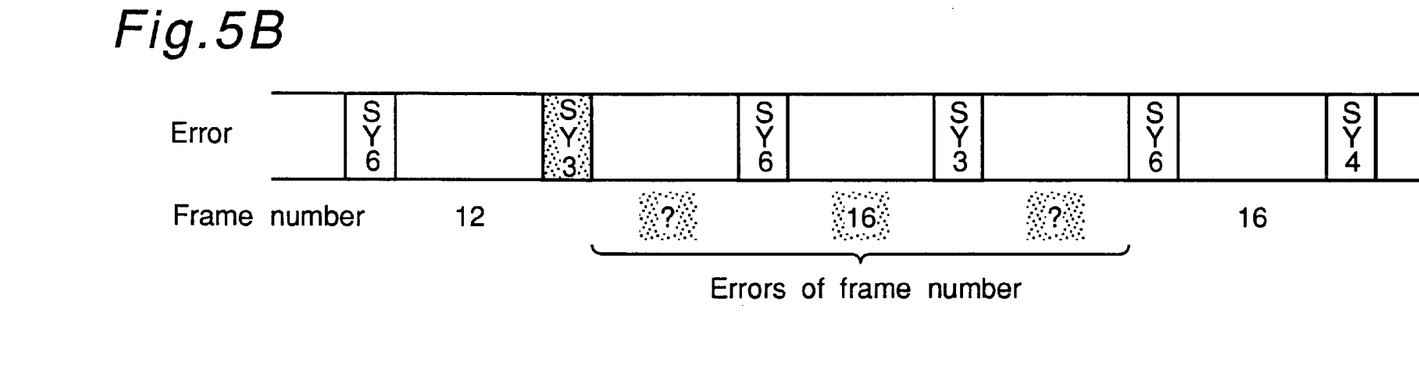

FIG. 4 shows sync numbers detected erroneously due to a bit shift by one bit for sync numbers SY0–SY7 defined in the DVD-ROM format. In FIG. 4, sections including open circles represent possibility of erroneous detection due to the bit shift by one bit between the sync number in the column and the sync number in the line. Then, erroneous detection of synchronizing signals is liable to occur. FIG. 5A shows an example of correct detection of frame number. On the other hand, FIG. 5B shows an example of erroneous detection observed previously when the bit shift by one bit occurs on synchronizing signals of input signals. It is assumed here that a frame number is identified from sync codes of three frames. In this example, a sync code for SY2 is erroneously detected as SY3 due to bit slip of one bit. If this erroneous detection occurs, the current frame number is decided to be 16. Then, the error correction circuit cannot perform correct error correction.

Figure 6:
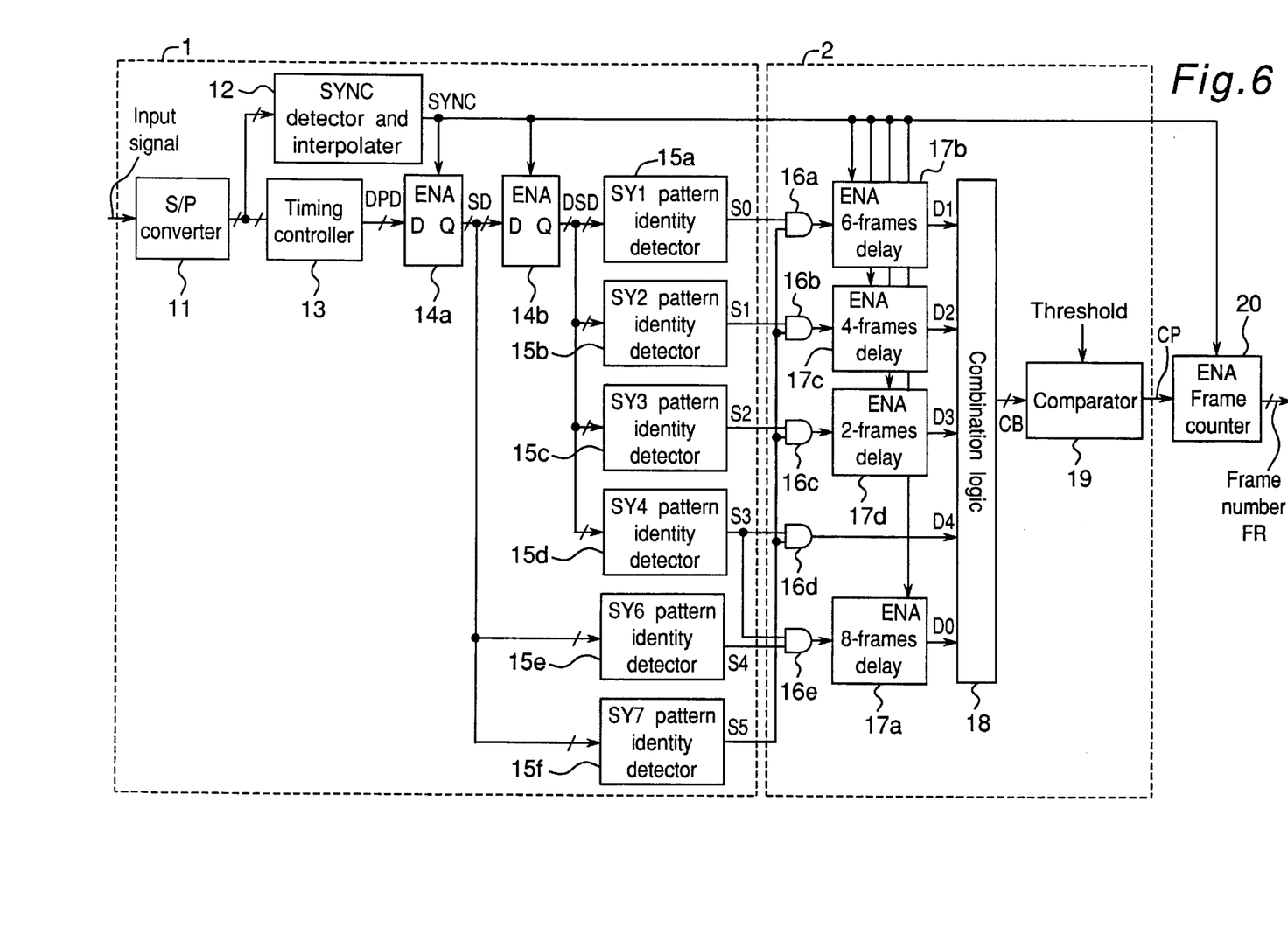
FIG. 6 is a block diagram of a frame number detector for detecting a frame number according to a first embodiment of the invention.

FIG. 6 shows the frame number detector 108 for detecting a frame number from the input signal. The frame number detector 108 has a circuit 1 for extracting synchronization patterns and a comparing circuit 2. The extracting circuit 1 extracts sync patterns from the input signal, and the comparing circuit 2 determines 26th frame with frame number of 26 by using majority rule, in contrast to prior art detectors. In the comparing circuit 2, two consecutive frames of pattern of synchronizing signals are dealt as one block, and it is checked whether the identity is detected at three or more blocks in consecutive five blocks, in order to preset the frame counter 20. The elements in the extracting circuit 1 and the comparing circuit 2 are provided for the majority decision for the frame number of 26.

In the extracting circuit 1, a serial-to-parallel (S/P) converter 11 receives the serial input signal, and converts it to a 32-bit parallel data at clocks synchronized by the bits. A SYNC detector-and-interpolator 12 receives the parallel data and detects sync signals by using identity of 14T4T code pattern. If a sync signal is not detected correctly at an interval of one frame, interpolation is performed to generate a synchronizing signal. In an example shown in FIG. 7, a prediction window is generated based on a previous synchronizing signal used as a reference. If 14T4T code is detected within the prediction window, a synchronizing signal SYNC is output with a delay by X bits relative to the 14T4T detection pulse, where X is larger than the width of the prediction window. If 14T4T pattern is not detected within the prediction window, a synchronizing signal SYNC is output after elapsing X bits from the center position of the prediction window. If 14T4T pattern continues to be detected outside the prediction window, the next prediction window is generated with reference to the 14T4T pattern detected outside the window. On the other hand, a timing controller 13 has a delay circuit of X bits to correct the timing shift between the synchronizing signal and the parallel data. It delays the parallel data by X bits. Then, a D flip-flop 14a latches the delayed parallel signal DPD by using the synchronizing signal SYNC as an enable signal to output the sync pattern data SD. Next, another D flip-flop 14b delays the sync pattern data by one frame by using the synchronizing signal as an enable signal.

There are provided six pattern identity detectors, that is, SY1 pattern identity detector 15a, SY2 pattern identity detector 15b, SY3 pattern identity detector 15c, SY4 pattern identity detector 15d, SY6 pattern identity detector 15e and SY7 pattern identity detector 15f. Each of an SY6 pattern identity detector 15e and an SY7 pattern identity detector 15f compares the 13-bit sync pattern data with an identification code in the sync codes shown in FIG. 3 received from the D flip-flop 14a. When identity happens, an SY6 identity pulse or an SY7 identity pulse is output. On the other hand, each of the SY1 pattern identity detector 15a to the SY4 pattern identity detector 15d compares the 13-bit delayed sync pattern data with an identification (ID) code in the sync codes shown in FIG. 3 received from the D flip-flop 14b. When identity happens, an SY1 identity pulse, an SY2 identity pulse, . . . , or an SY4 identity pulse is output.

In the comparing circuit 2 shown in FIG. 2, AND gates 16a to 16e perform AND operations of the identity pulses, and delay elements 17a–17d delay output signals of the AND gates 16a–16c, 16e. The AND gate 16e outputs an SY4/6 identity pulse, and an 8-frames delay element 17a delays the SY4/6 identity pulse by eight frames. The AND gate 16a outputs an SY1/7 identity pulse, and a 6-frames delay element 17b delays the SY1/7 identity pulse by six frames. The AND gate 16b outputs an SY2/7 identity pulse, and a 4-frames delay element 17c delays the SY2/7 identity pulse by four frames. The AND gate 16c outputs an SY3/7 identity pulse, and a 2-frames delay element 17d delays the SY3/7 identity pulse by two frames. The AND gate 16d outputs an SY4/7 identity pulse.

Next, a combination logic element 18 calculates the number of identity or "1" in the five input signals D0 to D4 from the delay elements 17a to 17d and the AND gate 16d and outputs the result CB. For example, if the five input signals are "01001", 2 of the number of "1" is output, and if the five input signals are "11101", 4 is output. Next, a comparator 19 compares the output CB of the combination logic element 18 with a predetermined threshold value. If the threshold is larger than the result CB, "1" is output, otherwise "0" is output. That is, the pattern is compared on a block consisting of two consecutive frames of the pattern of the synchronizing signals. If the pattern agrees by more than a predetermined threshold, it is decided that the current frame is 26th frame, and "0" is output to a frame counter 20 to designate the 26th frame. The frame counter 20 is preset to 26 when the output of the comparator 19 is 0; otherwise, it is incremented at each synchronizing signal. It is reset to "1" when the count exceeds 26. The count is output as the frame number FR.

Figure 7:
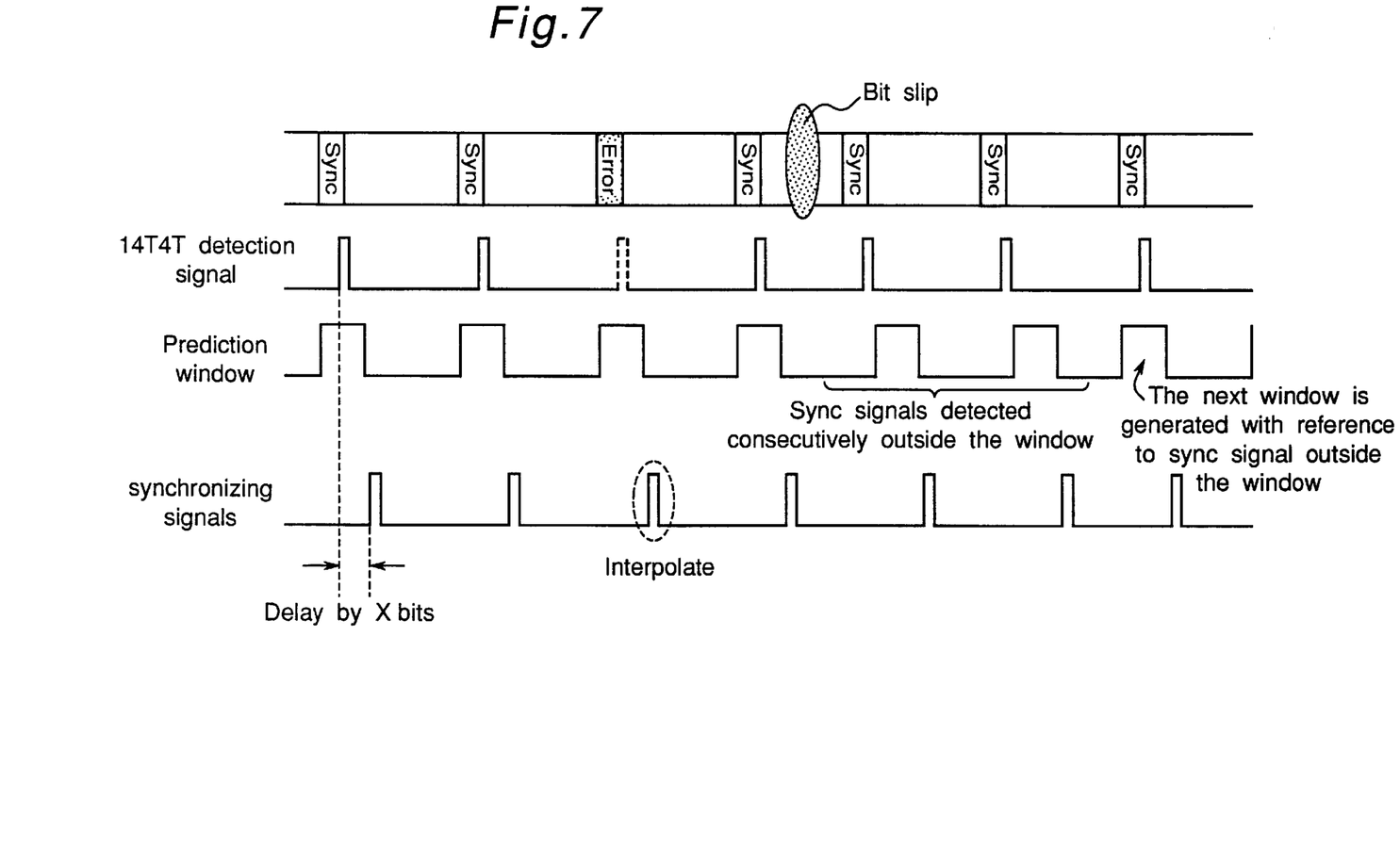
FIG. 7 is a timing chart for explaining operation of a sync signal detector and an interpolator of the embodiment.
Figure 8:
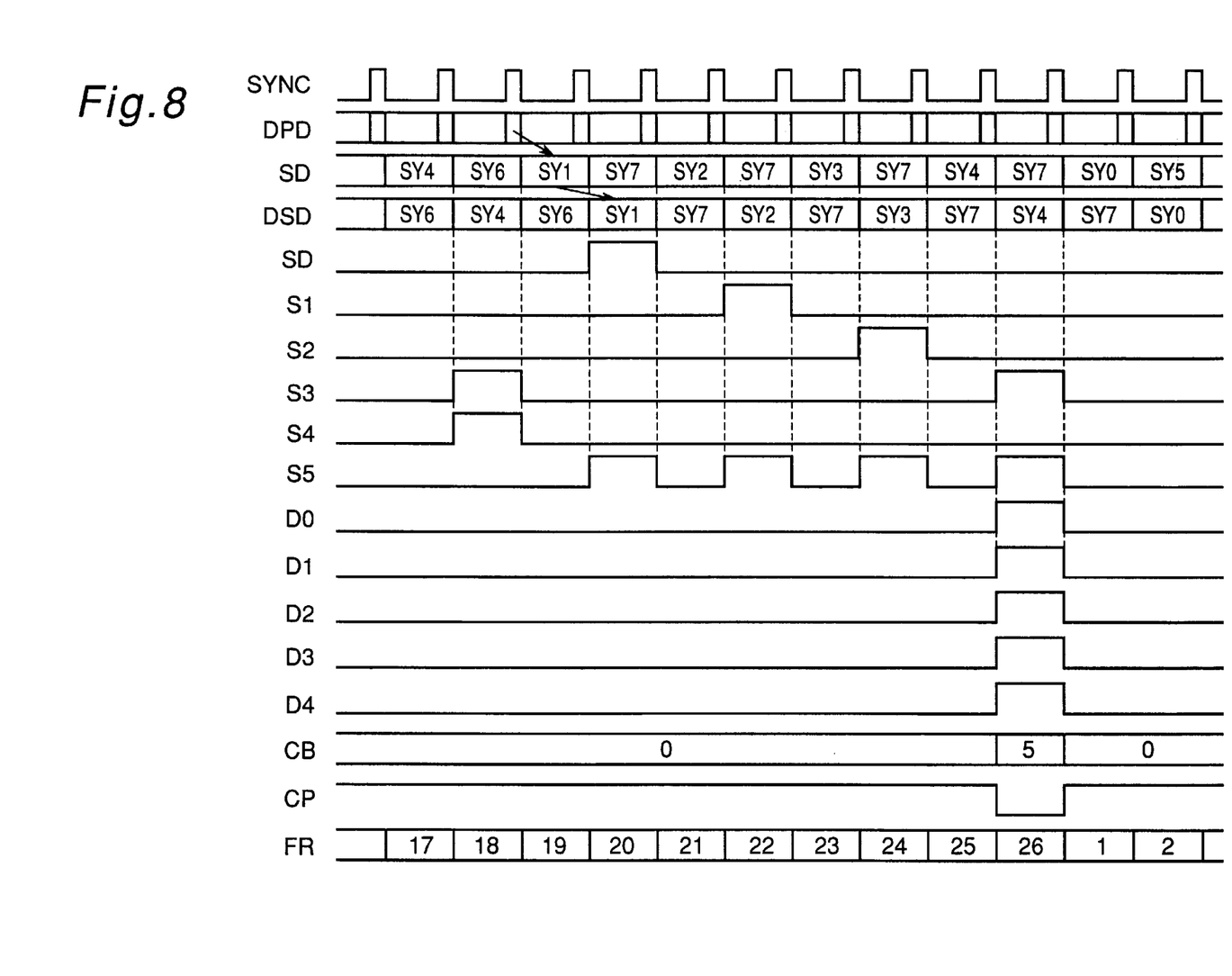
FIG. 8 is a timing chart in a case where the sync codes include no errors.
Figure 9:
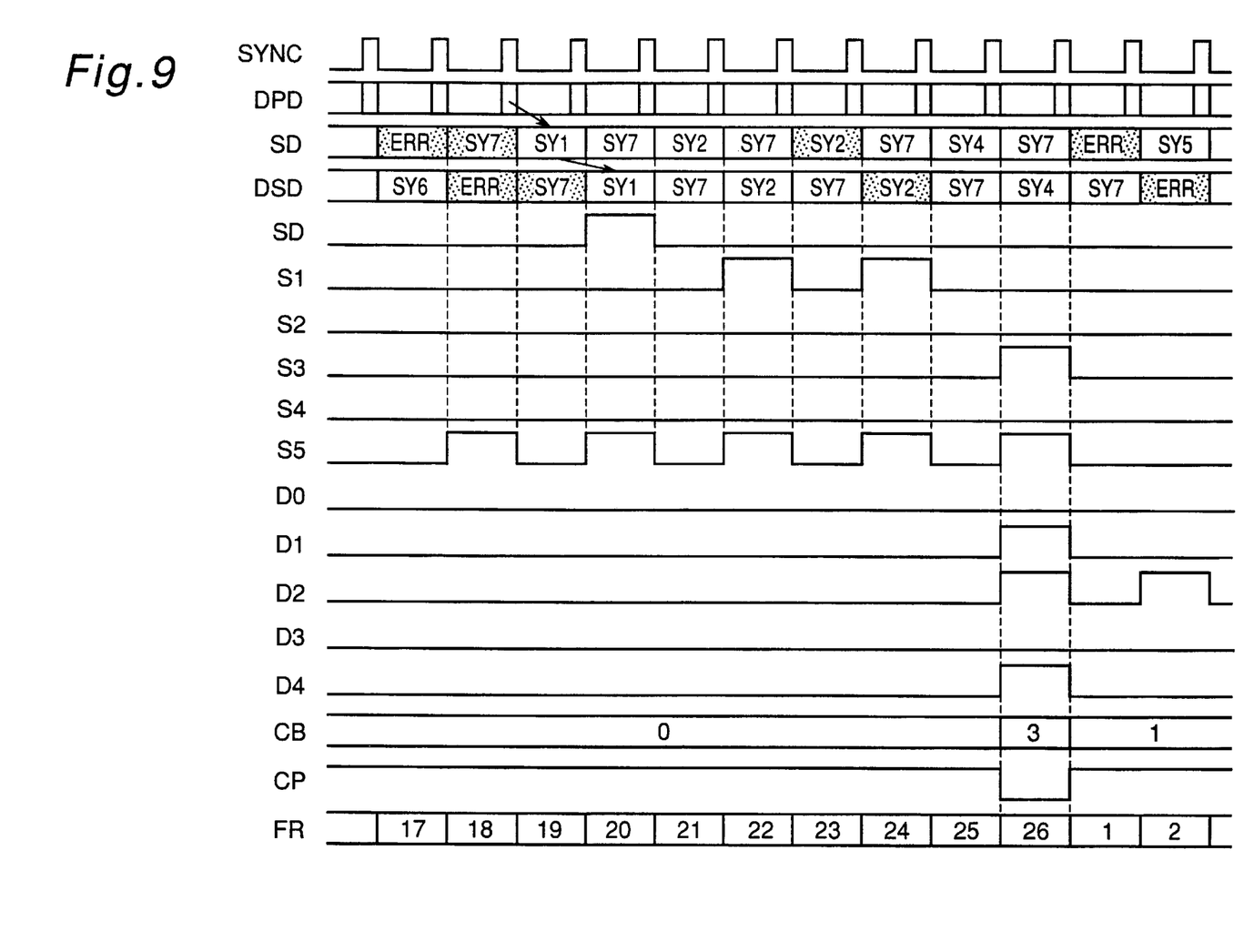
FIG. 9 is a timing chart in a case where the sync codes include errors which do not exceed a threshold value.

Two examples are explained on the correction of the frame number in the frame number detector. FIG. 7 is a timing chart in a case where all sync codes are detected normally, while FIG. 8 is a timing chart in a case where there are errors in the sync codes. In FIGS. 7 and 8, signal SYNC denotes a synchronizing signal outputted from the sync detector and interpolator 12, DPD denotes 32-bit delayed parallel data outputted from the timing corrector 13, SD denotes sync pattern data, such as SY4 pattern, outputted from the D flip flop 14a, DSD denotes delayed sync pattern data, such as SY6 pattern, outputted from the D flip flop 14b, S0 denotes an SY1 identity pulse outputted from the SY1 pattern detector 15a, S1 denotes an SY2 identity pulse outputted from the SY2 pattern detector 15b, S2 denotes an SY3 identity pulse outputted from the SY3 pattern detector 15c, S3 denotes an SY4 identity pulse outputted from the SY4 pattern detector 15d, S4 denotes an SY6 identity pulse outputted from the SY6 pattern detector 15e, and S5 denotes an SY7 identity pulse outputted from the SY7 pattern detector 15f. Further, D0 denotes an SY4/6 identity pulse outputted by the AND gate 16e and delayed by 8 frames by the 8-frames delay element 17a, D1 denotes an SY1/7 identity pulse outputted by the AND gate 16a and delayed by 6 frames by the 6-frames delay element 17b, D2 denotes an SY2/7 identity pulse outputted by the AND gate 16b and delayed by 4 frames by the 4-frames delay element 17c, D3 denotes an SY3/7 identity pulse outputted by the AND gate 16c and delayed by 2 frames by the 2-frames delay element 17d, D4 denotes an SY4/7 identity pulse outputted by the AND gate 16d, CB denotes the number of "1" outputted by the combination circuit 18, CP denotes a comparison result with a threshold outputted from the comparator 19, and FR denotes a frame number outputted from the frame counter 20.

In an example shown in FIG. 7, when all sync codes are detected, identity pulses D0, D1, D2, D3 and D4 become "1" at the same timing. Therefore, the count CB of identity is five. If the threshold is three, the result CP of the comparison becomes zero, and the frame number FR is preset to 26. Then, counting from 1 to 26 is repeated until the sync codes agree by more than the threshold.

Next, FIG. 8 shows another example when an error exists in the sync codes. Sections with dots in FIG. 8 represent sync codes detected erroneously. When sync codes are changed to other patterns or become patterns which should not exist, some of identity pulses D0, D1, D2, D3 and D4 become "1" and the others become "0". However, if the count CB of identity is equal to or larger than the threshold of three, CP becomes "1". Therefore, the frame number FR is preset to 26, and the counting from 1 to 26 is repeated until the sync codes agree by more than the threshold. Because of this operation, even when the sync codes include errors, it is possible to output correct frame numbers if the threshold is not exceeded.

In this embodiment, two consecutive frames having a pattern of synchronizing signal are dealt as one block, and it is checked whether the identity is detected by three blocks or more in the ten frames, in order to preset the frame counter. However, these may be different numbers. Further, for example, if the values are changed after burst errors occur, the frame number can be detected and corrected with higher precision.

In this embodiment, only the last frame number of 26 is detected to preset the frame counter. However, a different frame number can be detected. It is also possible to preset the frame counter with higher precision when errors occur by detecting a plurality of frame numbers for the correction of frame number.

Figure 10:
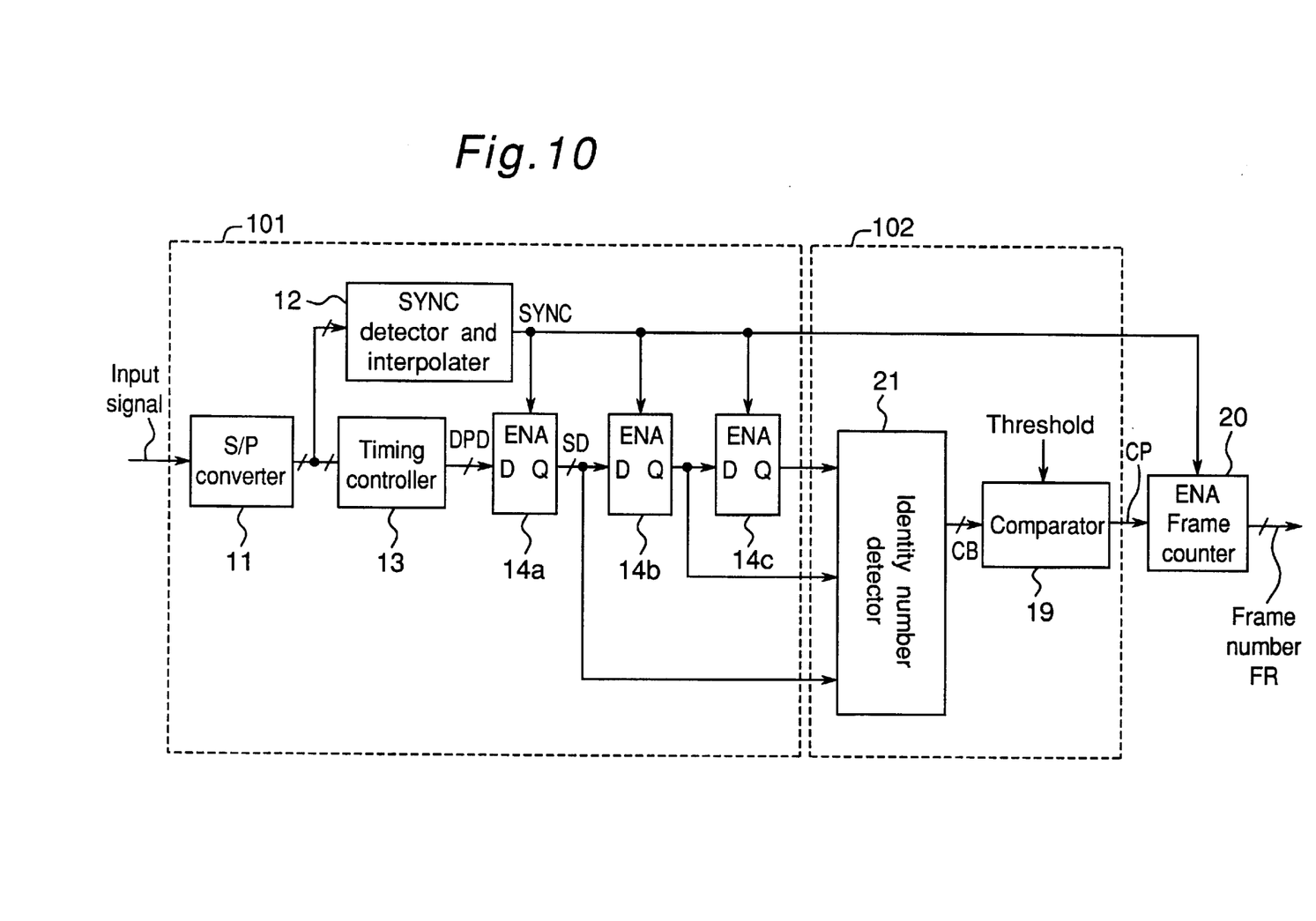
FIG. 10 is a block diagram of a frame number detector for detecting a frame number according to a second embodiment of the invention.

FIG. 10 is a block diagram of an apparatus for detecting a frame number according to a second embodiment of the invention. The apparatus has a circuit 101 to extract synchronization patterns and a comparing circuit 102. In this embodiment, the extracting circuit 101 extracts a pattern of synchronizing signals of consecutive X frames from the input signals, and the comparing circuit 102 compares the extracted pattern of synchronizing signals with a predetermined pattern to determine whether they agree with each other by at least Y bits (or a predetermined threshold), where X and Y are natural numbers. In the apparatus shown in FIG. 10, three D flip-flops 14a, 14b and 14c generate signals of three consecutive frames (X=3 in this example), and an identity number detector 21 detects the number of identity of the bits in the three frames. Then a comparator 19 compares the number of identity with the threshold.

As explained above, the identity of the extracted pattern is detected in the unit of bit in this embodiment. On the other hand, in the first embodiment, the identity of the extracted pattern is detected in the unit of block, and if the number of blocks of identity is smaller than the threshold, the frame number is decided not to be detected. However, in this situation, there is a case where a frame number can be detected correctly if the number of bits of identity is smaller than a predetermined threshold. This embodiment is advantageous for such situations.

In the embodiments, a hardware circuit is used to detect a frame number. However, it may be replaced with a software program.

Although the present invention has been fully described in connection with the preferred embodiments thereof with reference to the accompanying drawings, it is to be noted that various changes and modifications are apparent to those skilled in the art. Such changes and modifications are to be understood as being included within the scope of the present invention as defined by the appended claims unless they depart therefrom.

What is claimed is:

1. An apparatus for detecting a frame number from input signals, wherein the input signals consist of a plurality of sectors, a sector consisting of a plurality of frames, a frame including synchronizing signals and data, the synchronizing signals having a pattern used to identify a frame number in a sector, the pattern being defined to identify a frame number from a pattern of the synchronizing signals in a frame or from patterns of the synchronizing signals in consecutive frames, the apparatus comprising:

an extracting device operable to extract a pattern of synchronizing signals for consecutive X frames from input signals where X is a natural number;

a comparator operable to compare the extracted pattern of synchronizing signals extracted by said extracting device with a predetermined pattern for a predetermined number of consecutive frames to determine whether the extracted pattern agrees with the predetermined pattern by at least Y frames or not, wherein Y is a natural number smaller than the predetermined number of consecutive frames; and a device operable to determine a frame number based on an output signal of said comparator.

2. The apparatus according to claim 1, wherein a block consists of Z frames of the extracted pattern of synchronizing signals and said comparator is operable to compare the extracted pattern of synchronizing signals extracted by said extracting device with a predetermined pattern to determine whether the extracted pattern agrees with the predetermined pattern by at least Y' blocks or not, wherein and Y' and Z are natural numbers.

3. The apparatus according to claim 2, wherein Z=2.

4. The apparatus according to claim 1, wherein the predetermined pattern is defined to detect the last frame in a sector, and said determining device is a counter which is reset when the last frame is detected by said comparator and is incremented otherwise.

5. A method for detecting a frame number from input signals, wherein the input signals consists of a plurality of sectors, a sector consists of a plurality of frames, a frame including synchronizing signals and data, the synchronizing signals having a pattern used to identify a frame number in a sector, the pattern being defined to identify a frame number from a pattern of the synchronizing signals in a frame or from patterns of the synchronizing signals in consecutive frames, said method comprising:

extracting a pattern of synchronizing signals for consecutive X frames from input signals where X is a natural number;

comparing the extracted pattern of synchronizing signals with a predetermined pattern for a predetermined number of consecutive frames to determine whether the extracted pattern agrees with the predetermined pattern by at least Y frames or not, wherein Y is a natural number smaller than the predetermined number of consecutive frames; and determining a frame number based on an output signal of said comparing.

6. The method according to claim 5, wherein a block consists of Z frames of the extracted pattern of synchronizing signals and the extracted pattern of synchronizing signals is compared with a predetermined pattern to determine whether the extracted pattern agrees with the predetermined pattern by at least Y' blocks or not, wherein and Y' and Z are natural numbers.

7. The method according to claim 6, wherein Z=2.

8. The method according to claim 5, wherein the predetermined pattern is defined to detect the last frame in a sector, and a frame number is reset when the predetermined pattern is detected in said comparing and is incremented otherwise.

9. An apparatus for reproducing signals from an optical disk, wherein signals recorded in the optical disk consists of a plurality of sectors, a sector consisting of a plurality of frames, a frame including synchronizing signals and data, the synchronizing signals having a pattern used to identify a frame number in a sector, the pattern being defined to identify a frame number from a pattern of the synchronizing signals in a frame or from patterns of the synchronizing signals in consecutive frames, the apparatus comprising:

an optical pickup operable to detect a light reflected from an optical disk;

a reproducing device operable to reproduce digital data from the reflected light; and a decoder operable to decode the digital data;

wherein said decoder comprises an apparatus operable to detect a frame number from the digital signals;

said apparatus for detecting frame number comprising:

an extracting device operable to extract a pattern of synchronizing signals for consecutive X frames from input signals where X is a natural number;

a comparator operable to compare the extracted pattern of synchronizing signals extracted by said extracting device with a predetermined pattern for a predetermined number of consecutive frames to determine whether the extracted pattern agrees with the predetermined pattern by at least Y frames or not, wherein Y is a natural number smaller than the predetermined number of consecutive frames; and a determining device operable to determine a frame number based on an output signal of said comparator.

10. The apparatus according to claim 9, wherein a block consists of Z frames of the extracted pattern of synchronizing signals and said comparator is operable to compare the extracted pattern of synchronizing signals extracted by said extracting device with a predetermined pattern to determine whether the extracted pattern agrees with the predetermined pattern by at least Y' blocks or not, wherein Y' and Z are natural numbers.

11. The apparatus according to claim 12, wherein Z=2.

12. The apparatus according to claim 9, wherein the predetermined pattern is defined to detect the last frame in a sector, and said determining device is a counter which is reset when the last frame is detected by said comparator and is incremented otherwise.

* * * * *

UNITED STATES PATENT AND TRADEMARK OFFICE
CERTIFICATE OF CORRECTION

PATENT NO. : 6,236,631 B1
DATED : May 22, 2001
INVENTOR(S) : Hironori Deguchi et al.

It is certified that error appears in the above-identified patent and that said Letters Patent is hereby corrected as shown below:

Title page,
Item [75] "Makoto Usui, Osaki" should read -- Makoto Usui, Osaka --

Signed and Sealed this

Fourteenth Day of May, 2002

Attest:

JAMES E. ROGAN
*Attesting Officer*   *Director of the United States Patent and Trademark Office*